United States Patent
Ooyama et al.

(10) Patent No.: US 6,307,294 B1
(45) Date of Patent: Oct. 23, 2001

(54) MAGNETIC SUSPENDING DEVICE CONTROLLED BY TEMPERATURE OF CONTROLLED OBJECT

(75) Inventors: Atsusi Ooyama; Hiroyuki Chino; Toshiharu Nakazawa; Atsushi Shiokawa, all of Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/522,471

(22) Filed: Mar. 9, 2000

(30) Foreign Application Priority Data

Mar. 11, 1999 (JP) .................................................. 11-064989

(51) Int. Cl.$^7$ ...................................................... H02K 7/09
(52) U.S. Cl. ........................................ 310/90.5; 310/68 C
(58) Field of Search .............................. 310/68 B, 68 C, 310/90.5; 324/207.2, 207.25, 207.12, 123.376, 207.11; 318/611, 632; 385/26, 24, 25, 57, 15

(56) References Cited

U.S. PATENT DOCUMENTS

| | | | |
|---|---|---|---|
| 4,180,946 | 1/1980 | Heijkenskjold et al. | . |
| 4,652,820 | * 3/1987 | Maresca | 310/90.5 |
| 5,159,246 | * 10/1992 | Ueki | 318/254 |
| 5,444,369 | * 8/1995 | Luetzow | 324/207.2 |
| 5,530,306 | * 6/1996 | Ueyama | 310/90.5 |
| 5,576,587 | * 11/1996 | Takahashi et al. | 310/90.5 |
| 5,640,472 | 6/1997 | Meinzer et al. | . |
| 5,696,412 | * 12/1997 | Iannello | 310/90.5 |
| 5,736,800 | * 4/1998 | Iannello et al. | 310/90.5 |
| 5,760,511 | * 6/1998 | Nakagawa et al. | 310/90.5 |
| 5,923,559 | * 7/1999 | Yamamoto | 364/474.12 |

FOREIGN PATENT DOCUMENTS

| | | |
|---|---|---|
| 0 716 241 A1 | 6/1996 | (EP) . |
| 61201921 | 9/1986 | (JP) . |
| 7-139546 | * 11/1993 | (JP) . |

* cited by examiner

Primary Examiner—Tran Nguyen
(74) Attorney, Agent, or Firm—Armstrong, Westerman, Hattori, McLeland & Naughton, LLP (57) ABSTRACT

A magnetic suspending device which can detect the temperature of a controlled object and assure a safe operation thereof without any need for any special construction or work to the device and any special maintenance is disclosed. In the magnetic suspending device comprising a pair of electromagnets (11, 13) disposed opposite to each other, a magnetizable controlled object (15) disposed between the pair of electromagnets (11, 13) and position displacement detection sensors (12, 14) disposed opposite to each other for detecting a position displacement of the controlled object (15), wherein detection signals from the position displacement detection sensors (12, 14) are inputted to a control circuit unit (20) for performing phase compensation and gain adjustment, wherein control outputs from the control circuit unit (20) control magnetic attractive or repulsive forces of the pair of electromagnets (11, 13), and wherein the controlled object is magnetically suspended by the pair of electromagnets without contact at an arbitrary position, a temperature operational circuit unit (30) is provided for detecting the size and temperature of the controlled object (15) using the detection signals from the position displacement detection sensors (12, 14).

3 Claims, 7 Drawing Sheets

Fig. 1

PRIOR ART

MAGNETIC SUSPENDING DEVICE CONTROLLED BY TEMPERATURE OF CONTROLLED OBJECT

BACKGROUND OF THE INVENTION

The present invention relates to a magnetic suspending device for magnetically suspending a magnetizable controlled object without contact at an arbitrary position by making use of magnetic attractive or repulsive forces generated by electromagnets.

Figure 1:
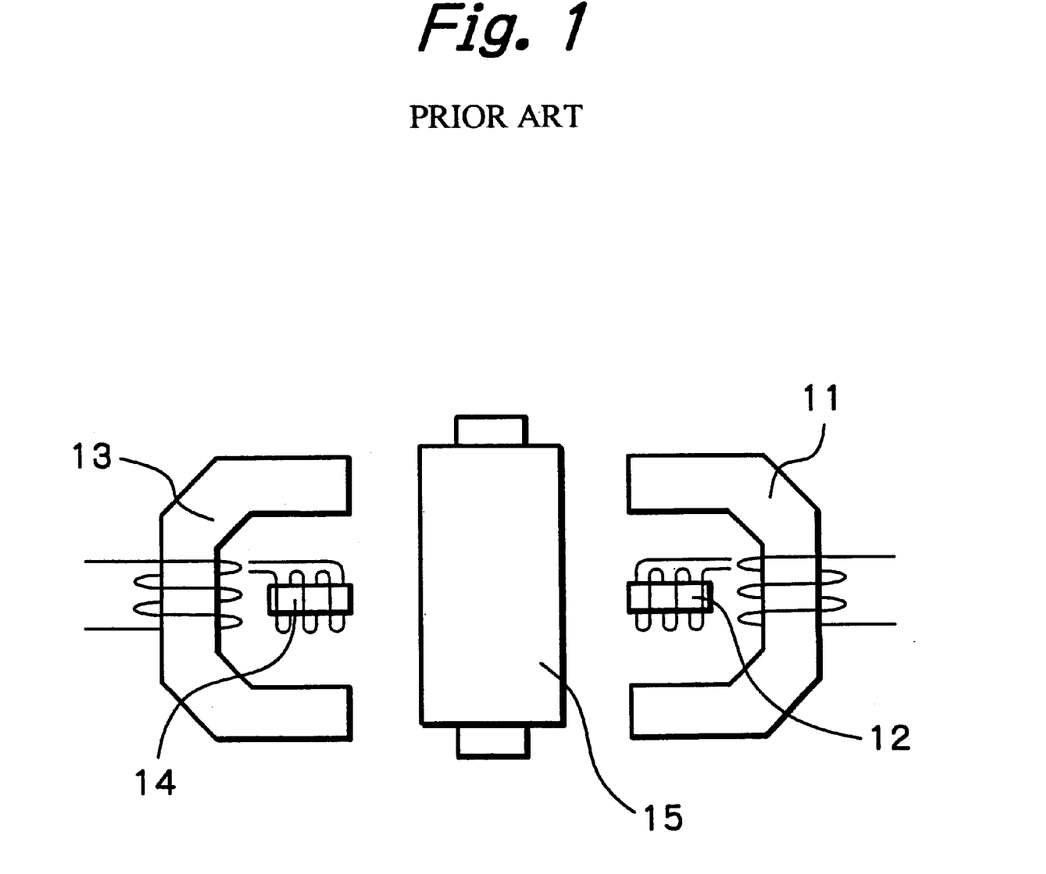
FIG. 1 is a schematic diagram showing the construction of a magnetic suspending device.
Figure 2:
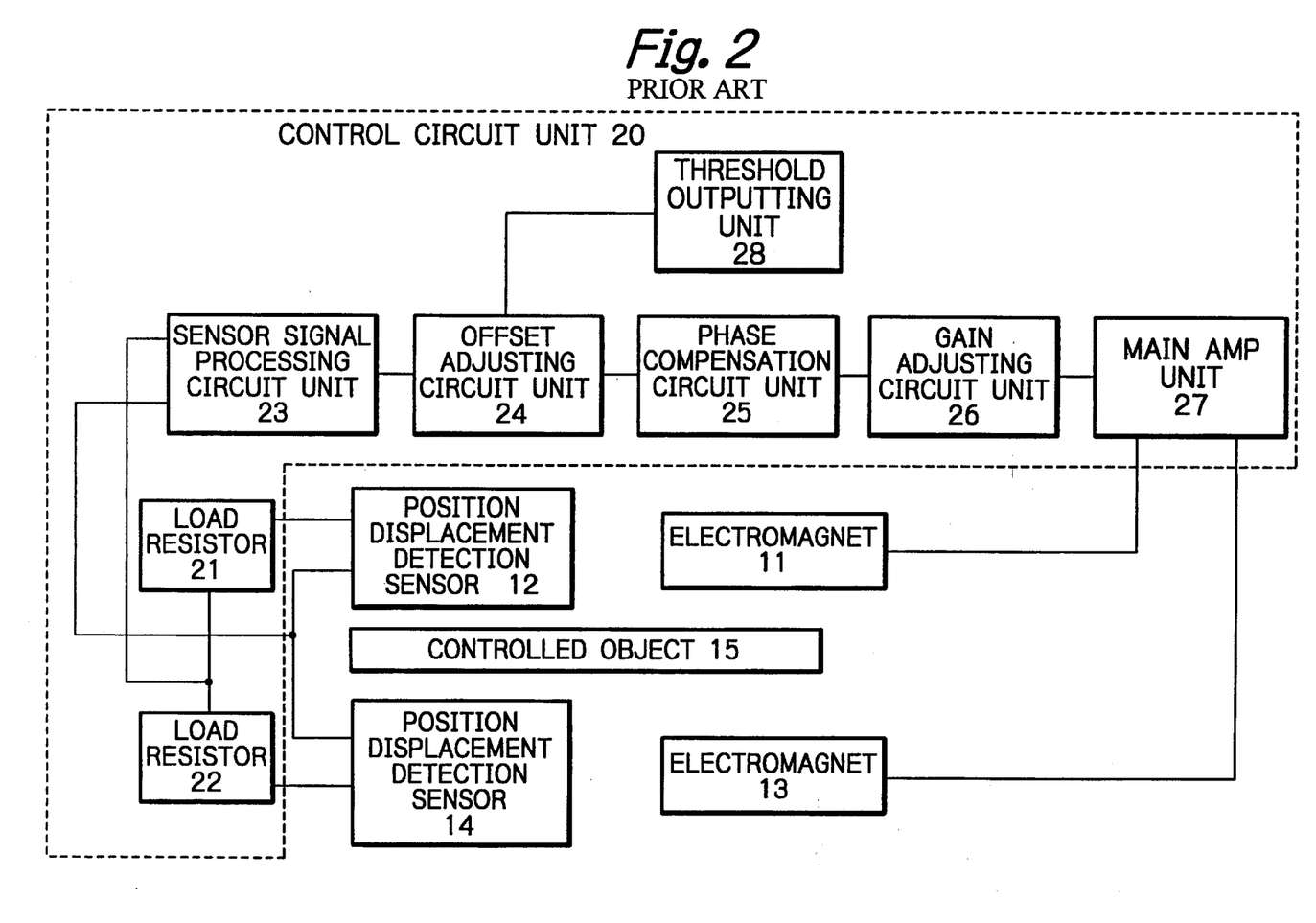
FIG. 2 shows a circuit diagram of a control circuit unit used in a conventional magnetic suspending device for controlling magnetic suspension and support thereof.

FIG. 1 is a schematic diagram showing the construction of a magnetic suspending device of this type, and FIG. 2 is a circuit diagram showing the construction of a control device for controlling the magnetic suspension and support of the magnetic suspending device. As shown in those figures, the magnetic suspending device comprises a pair of electromagnets 11, 13 disposed opposite to each other, a magnetizable controlled object 15 disposed between the pair of electromagnets and position displacement detection sensors 12, 14 disposed opposite to each other for detecting a position displacement of the controlled object 15.

Detection signals from the position displacement detection sensors 12, 14 are inputted into a control circuit unit 20 for performing phase compensation and gain adjustment, and magnetic attractive or repulsive forces generated by the pair of electromagnets 11, 13 are controlled by control outputs from the control circuit unit 20 so as to suspend the controlled object 15 without contact at an arbitrary position between the pair of electromagnets 11, 13.

The control circuit unit 20 comprises load resistors 21, 22, a sensor signal processing circuit unit 23, an offset adjusting circuit unit 24, a phase compensating circuit unit 25, a gain adjusting circuit unit 26, a main amplifier unit 27 and a threshold outputting unit 28. Detection signals from the position displacement detection sensors 12, 14 are directed to the phase compensating circuit unit 25 and the gain adjusting circuit unit 26 for phase compensation and gain adjustment through the load resistors 21, 22, the sensor signal processing circuit unit 23 and the offset adjusting circuit unit 24, and the signals so compensated and adjusted are then fed back to the electromagnets 11, 13 through the main amplifier unit 27.

Examples of such a control circuit unit are described in Japanese Patent Publication No. Sho 61-37643 and Japanese Patent Laid-open No. Hei 9-257035, and those documents are expressly incorporated herein by reference in its entirety.

In a magnetic suspending device utilizing such a closed-loop control as described above, the controlled object 15 magnetically suspended by magnetic attractive or repulsive forces generated by the pair of electromagnets 11, 13 receives strong electromagnetic forces from the electromagnets 11, 13 or rotational driving electromagnets (not shown) at any time while being magnetically suspended. This generates secondary current flows in the controlled object 15 in such a direction as to cancel the electromagnetic forces received from the electromagnets 11, 13, and this secondary current flows and the electrical resistance of the controlled object 15 itself generate secondary loss heat.

The above described magnetic suspending device is used, for example, as a magnetic bearing device. in this case, it is difficult to dissipate heat from the controlled object 15 and/or cool the object 15 by virtue of heat conduction, because the construction of the magnetic suspending device allows the secondary loss heat, generated in the controlled object 15, to be generated only in a state in which the controlled object 15 is held without contact. In particular, in the case of a magnetic bearing device used in a vacuum atmosphere, since there exists very little heat conductive substance such as gas between the controlled object 15 and the electromagnets 11, 13 surrounding the object, the controlled object 15 can be cooled only to a very small extent by virtue of heat conduction. Therefore, if the controlled object 15 is heated abnormally by being run for a long time or by radiation heat received from the surrounding environment of the magnetic bearing device, it is difficult to dissipate heat to the outside of the device.

As described above, in a case where the temperature of the controlled object 15 goes up abnormally, it will cause materials (such as metal) deformation and/or brittle fracture of respective constituent components of the controlled object 15, resulting in a failure fatal to the device.

With a view to preventing such a failure, a protective means has been developed in which the magnetic suspending device is operated, by measuring and monitoring the temperature of the controlled object 15, within a range of temperature where the respective constituent components of the controlled object 15 can safely be used. Conventionally, such a protective means has been used to measure the temperature of the controlled object by means of an optical means such as a radiation thermometer so as to stop the operation of the control device of the magnetic suspending device when a measured temperature becomes equal to or higher than a predetermined temperature.

As described above, when the temperature of the controlled object 15 is measured by a radiation thermometer, the temperature needs to be measured directly by detecting infrared radiation emitted from the controlled object 15. In a case, however, where the controlled object 15 is used in a vacuum or gaseous atmosphere and hence needs to be isolated from the outside, it is necessary to provide a measuring window in the magnetic suspending device for transmission of infrared radiation emitted from the controlled object 15 or to arrange for the infrared radiation to reach a radiation temperature measuring unit through the interior of the magnetic suspending device via a predetermined path without leaking from the device to the outside. To do this, the magnetic suspending device needs to be specially worked or structured, for example, such that an infrared radiation extraction path using optical fibers is provided, thus causing such a problem as troublesome production process and increase In costs.

Furthermore, in a case where the temperature of the controlled object 15 is measured using any optical technique, if a change in transmittance of infrared radiation due to a smudge on the measuring window or deterioration with age of the optical fibers occurs in a path which transmits the infrared radiation and which runs up to a detection part of the radiation thermometer provided outside the magnetic suspending device, the temperature of the controlled object cannot be measured accurately, and this requires maintenance work including readjustment of the radiation thermometer and replacement of a part of the radiation transmission path.

SUMMARY OF THE INVENTION

The present invention has been proposed in view of the aforesaid drawbacks of the prior art, and an object of the present invention is to provide a magnetic suspending device which can detect the temperature of a controlled object and assure a safe operation of the suspension device without any need for special construction of the magnetic suspension device, special work done thereto and special maintenance therefor.

In order to achieve the object of the present invention, the invention described in claim 1 provides a magnetic suspending device comprising:

- a pair of electromagnets disposed opposite to each other;
- a magnetizable controlled object disposed between said pair of electromagnets;
- position displacement detection sensors disposed opposite to each other for detecting a position displacement of said controlled object;
- a control device for controlling magnetic forces generated by said pair of electromagnets so as to magnetically suspend said controlled object without contact in accordance with detection signals outputted from said position displacement detection sensors; and
- a temperature calculation circuit for detecting a change in size of said control object on the basis of the detection signals from said position displacement detection sensors, thereby detecting the temperature of said controlled object.

Since the material constituting the controlled object has a predetermined linear expansion coefficient, the volume of the object increases with an increase in temperature, whereby gaps between the controlled object and the position displacement detection sensors become narrower, and such a change appears in the outputs of the position displacement detection sensors. The temperature calculation circuit detects the temperature of the controlled object using the outputs from the position displacement detection sensors.

According to the invention described in claim 1, since the temperature calculation circuit is provided for detecting the temperature of the controlled object using the detection signals outputted from the position displacement detection sensors, it is possible to detect the temperature of the controlled object at any time and to assure a safe operation of the device without any need for special construction thereof, special work thereto and special maintenance therefor.

The invention described in claim 2 provides a magnetic suspending device as set forth in claim 1, wherein the temperature calculation circuit is provided as a displacement detection circuit system separate from a magnetic suspension control system operative to perform processing in the control circuit, said temperature calculation circuit operable to detect the size of the gaps between the controlled object and the position displacement detection sensors without giving any influence to the magnetic suspension control system, thereby detecting the temperature of the controlled object using a change in size of the gaps.

As described above, since the temperature calculation circuit is provided as the displacement detection circuit system separate from the magnetic suspension control system operative to perform processing in the control circuit, it is possible that the temperature of the controlled object can be detected without giving any influence to the magnetic, suspension control system by causing the outputs from the position displacement detection sensors to be shunted and inputted into the temperature calculation circuit.

The invention described in claim 3 provides a magnetic suspending device as set forth in claim 1 or 2, further comprising a protection circuit for giving an alarm to the outside and/or for stopping the operation of the magnetic suspending device if the temperature of the controlled object detected by the temperature calculation circuit becomes equal to or higher than a predetermined temperature,.

The protection circuit constructed as described above makes it possible to give an alarm to the outside and/or to stop the operation of the magnetic suspending device before materials deformation and/or brittle fracture of the respective constituent components of the controlled object occur if the temperature of the controlled object goes up abnormally, and, therefore, it is possible to remove any cause of a failure fatal to the device.

BRIEF DESCRIPTION OF THE DRAWINGS

The various features and advantages of the present invention may be more readily understood with reference to the following detailed description taken in conjunction with the accompanying drawings, wherein like reference numerals designate. like structural elements, and in which.

DETAILED DESCRIPTION OF THE INVENTION

Figure 3:
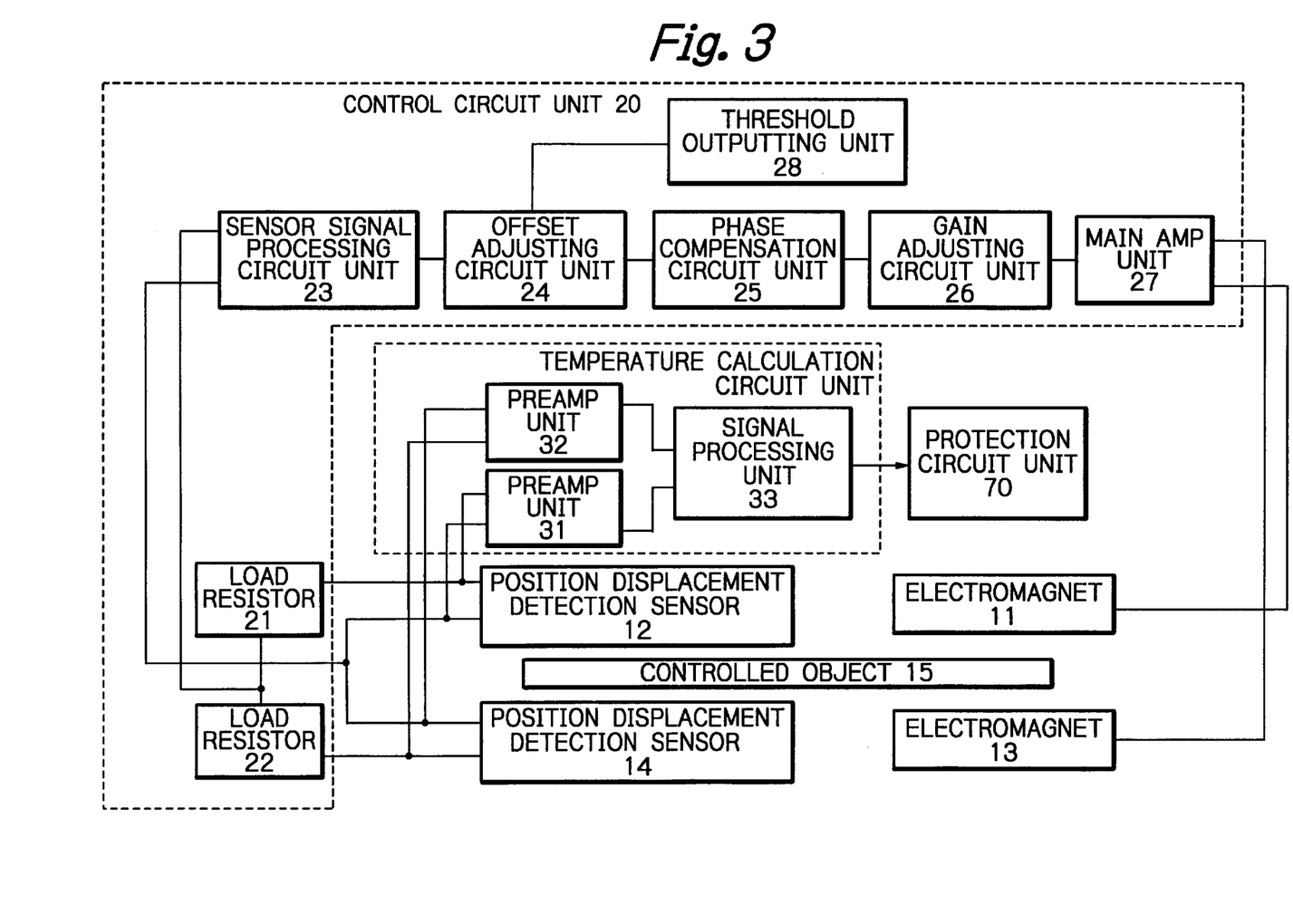
FIG. 3 shows a circuit diagram of a control device of a magnetic suspending device according to the present invention for controlling magnetic suspension and support of the device.

An embodiment of the present invention will hereafter be described in reference to the accompanying drawings. FIG. 3 shows the construction of a control device of a magnetic suspending device according to the present invention. In FIG. 3, components to which the same reference numerals as those in FIGS. 1 and 2 correspond to the same or identical parts, and this is true in the other drawings attached hereto. The control circuit unit of the magnetic suspending device according to the present invention is identical to that shown in FIG. 2 in construction in that a controlled object 15 is magnetically suspended without contact at an arbitrary position between a pair of electromagnets 11, 13 by allowing detection signals from position displacement detection sensors 12, 14 to be inputted to a control circuit unit 20 for performing phase compensation and gain adjustment and by controlling magnetic attractive or repulsive forces generated by the pair of electromagnets 11, 13 by control outputs from the control circuit unit 20.

Figure 4:
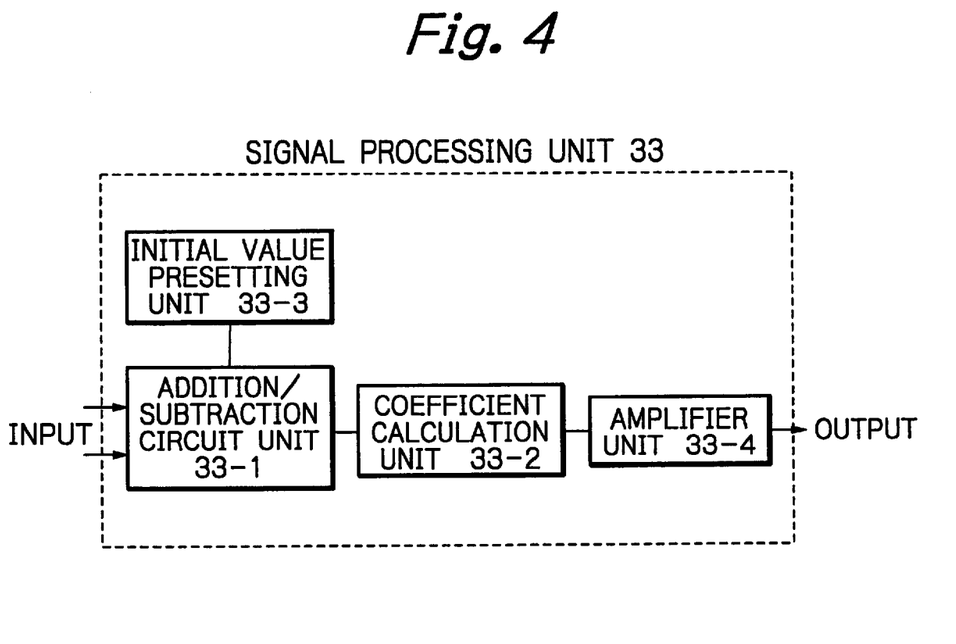
FIG. 4 is a block diagram showing the construction of a signal processing unit of a temperature calculation circuit unit of the control circuit unit in the magnetic suspending device according to the present invention.

The control device shown in FIG. 3 is different from the control circuit unit shown in FIG. 2 in that a temperature calculation circuit unit 30 is provided, whereby the detection signals from the position displacement detection sensors 12, 14 are shunted so as to be led to the temperature calculation circuit unit 30 for the purpose of detecting the temperature of the controlled object 15 without contact and that a protection circuit unit 70 is provided for giving an alarm to the outside and stopping a magnetic suspension control if the temperature of the controlled object 15 detected by the temperature calculation circuit unit 30 becomes equal to or higher than a predetermined temperature value. The temperature calculation circuit unit 30 comprises preamplifiers 31, 32 and a signal processing unit 33. The signal processing unit 33 comprises, as shown in FIG. 4, an addition/subtraction circuit unit 33-1, a coefficient calculation unit 33-2, an initial value presetting unit 33-3 and an amplifier unit 33-4.

Figure 5:
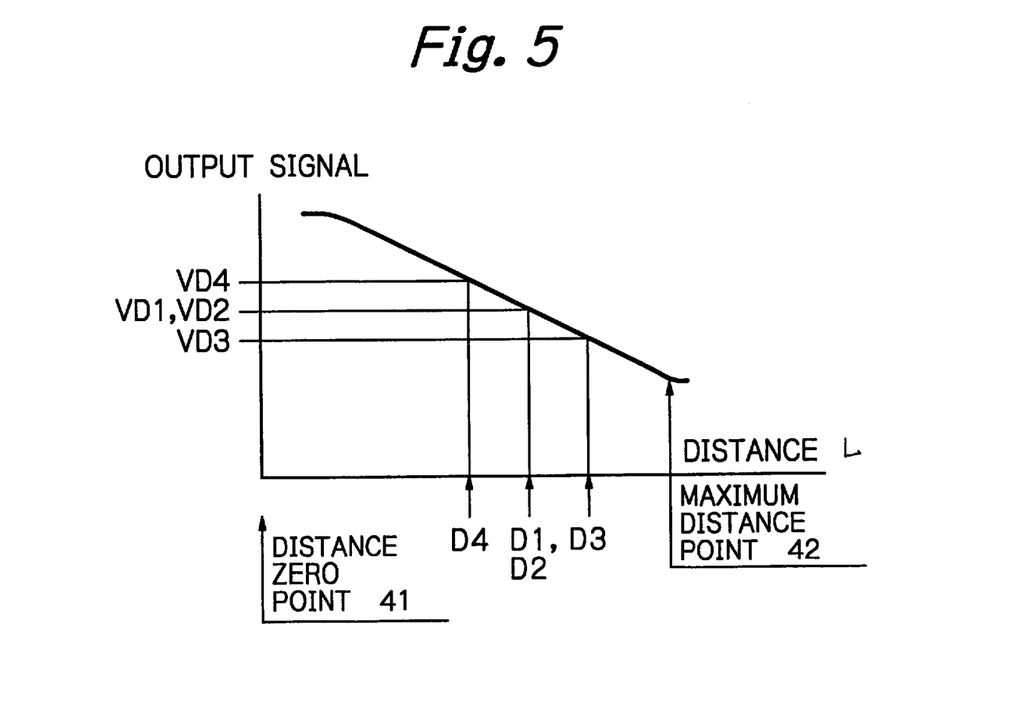
FIG. 5 is a diagram showing a relationship between gap distances between a controlled object and position displacement detection sensors and output signals from the position displacement sensors when the magnetic suspending device performs a magnetic suspension control.

As shown in FIG. 1, the position displacement detection sensors 12, 14 are in general disposed opposite to each other at both sides of the controlled object 15, and a combination of detection signals detected by the respective position displacement detection sensors 12, 14 represents a detection characteristic. Paying attention to the respective detection signals from the pair of position displacement detection sensors 12, 14 disposed opposite to each other, it is understood that the respective position displacement detection sensors 12, 14 detect distances between the controlled object 15 and the sensors on the basis of such characteristics as shown in FIG. 5. In FIG. 5, the axis of abscissa indicates a distance L between the controlled object 15 and one of the position displacement detection sensors 12, 14, while the axis of ordinates indicates output signals from the position displacement detection sensors 12, 14.

Figure 6:
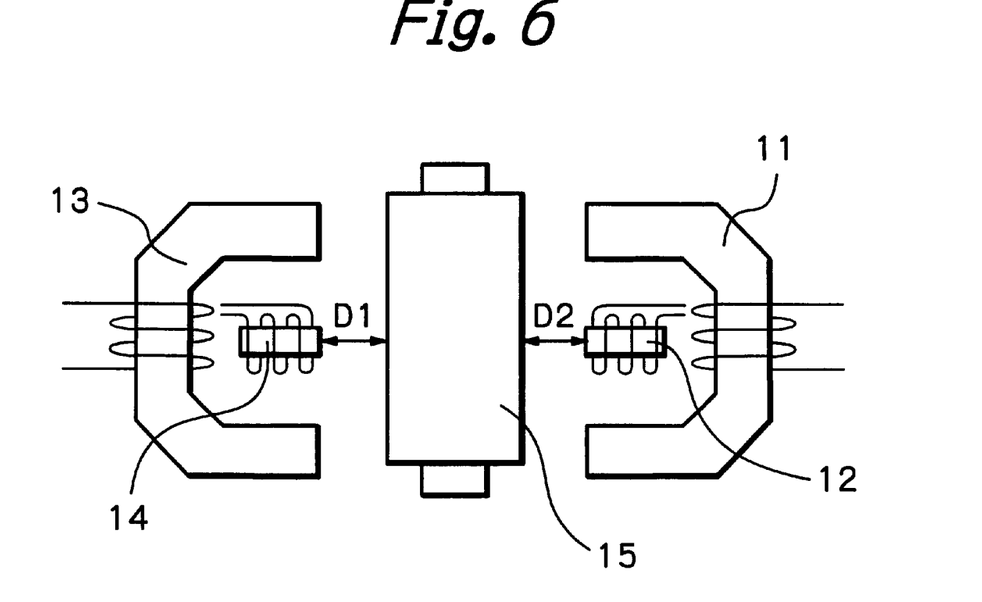
FIG. 6 is a diagram showing a relationship between the controlled object and the position displacement detection sensors when the magnetic suspending device performs a magnetic suspension control.
Figure 7:
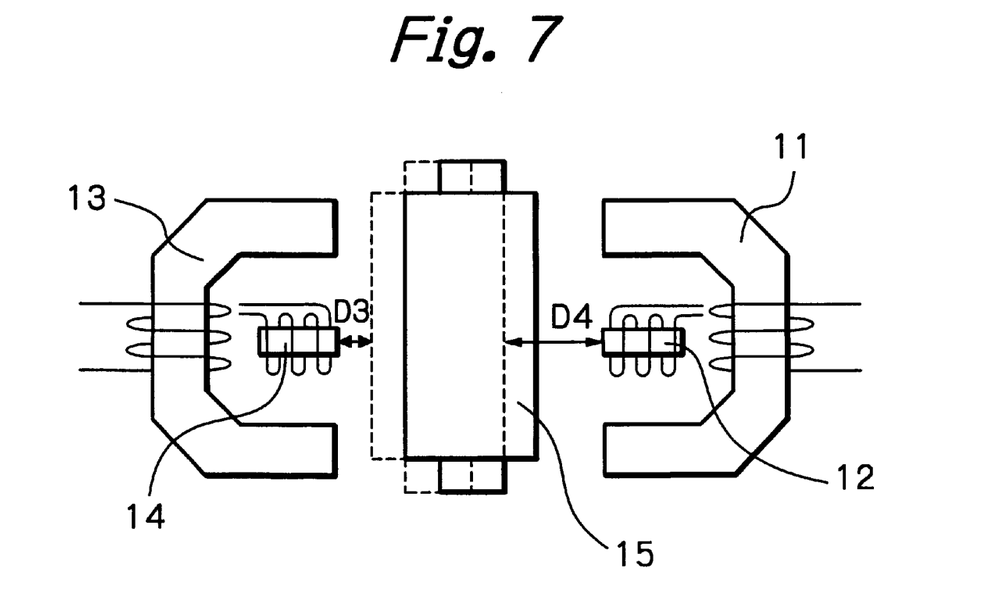
FIG. 7 is a diagram showing a relationship between the controlled object and the position displacement detection sensors when the magnetic suspending device performs a magnetic suspension control.

In the magnetic suspending device such as a magnetic bearing, the controlled object 15 is controlled at any time such as to be positioned at the center of the position displacement detection sensors disposed opposite to each other. As a result, as shown in FIG. 6, distances D1, D2 from the respective position displacement detection sensors 12, 14 to the controlled object 15 become substantially equal. If the controlled object 15 is movable, as shown in FIG. 7, between a position indicated by a solid line and a position indicated by a dotted line between the electromagnets and the position displacement detection sensors, distances D3, D4 from the respective position displacement detection sensors 12, 14 to the controlled object 15 are determined so that the controlled object 15 is at a position where a load applied to the controlled object 15 equilibrates the magnetic attractive or repulsive forces exerted from the electromagnets 11, 13.

As shown in FIG. 5, assume that outputs of the position displacement detection sensors 12, 14 when the position displacement detection sensors are at the distances D1, D3 are VD1, VD3, respectively, and that outputs of the position displacement detection sensors 12, 14 when the position displacement detection sensors are at the distances D2, D4 are VD2, VD4, respectively. Then, a sum of signals indicative of gaps between the individual position displacement detection sensors 12, 14 and the controlled object 15 is expressed as follows:

$$2 \times VD1 = VD3 + VD4 (VD1 = VD2) \qquad (1)$$

This equation (1) holds true at every position where the controlled object 15 moves between the position displacement detection sensors 12, 14.

Figure 8:
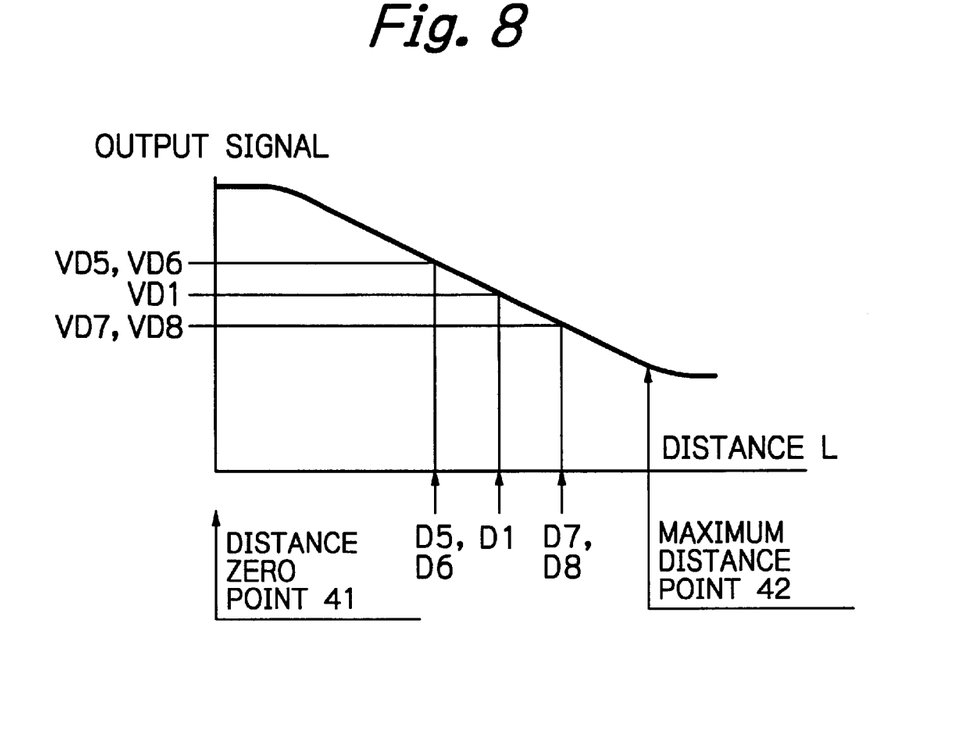
FIG. 8 is a diagram showing a relationship between gap distances between the controlled object and position displacement detection sensors and the output signals from the position displacement detection sensors when there occurs a change in temperature while the magnetic suspending device performs a magnetic suspension control.
Figure 9:
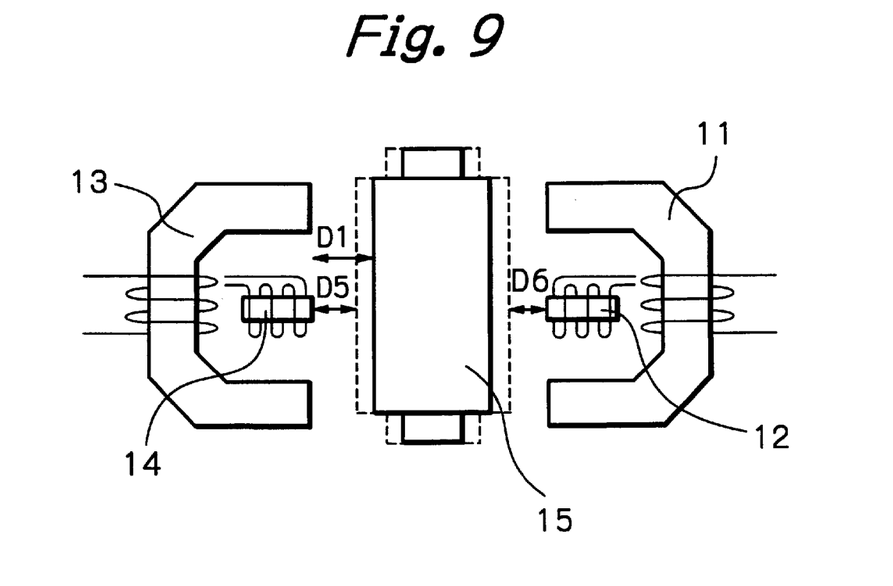
FIG. 9 is a diagram showing a relationship between the controlled object and the position displacement detection sensors when there occurs an increase in temperature while the magnetic suspending device performs a magnetic suspension control.

If the temperature of the controlled object 15 goes up high for some reason, the size of the controlled object 15 increases due to thermal expansion of the mechanical components constituting the controlled object 15, as shown in FIG. 9. As a result, the gaps D5, D6, respectively, between the position displacement detection sensors 12, 14 and the controlled object 15 are reduced compared with the distance D1 detected in a normal condition. This allows the output signals from the respective position displacement detection sensors 11, 14 to become VD5, VD6, respectively, shown in FIG. 8, and a sum of the outputs of the position displacement detection sensors 12, 14 is expressed as follows:

$$2 \times VD1 < VD5 + VD6 (VD1 = VD2) \qquad (2)$$

The equation (2) shows deviation from the condition which satisfies the equation (1).

Figure 10:
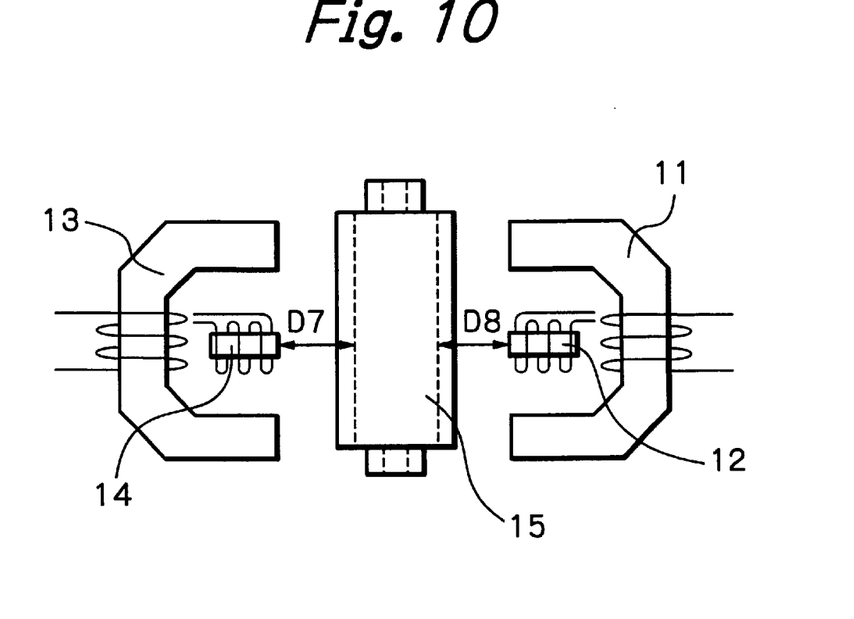
FIG. 10 is a diagram showing a relationship between the controlled object and the position displacement detection sensors when there occurs a decrease in temperature while the magnetic suspending device performs a magnetic suspension control.

In addition, if the temperature of the controlled object 15 goes down for some reason, as shown in FIG. 10, the size of the controlled object 15 reduces due to low temperature contraction of the mechanical components constituting the controlled object 15. As a result, distances D7, D8, respectively, between the position displacement detection sensors 12, 14 and the controlled object 15 increase compared with the distance D1 detected in a normal condition. This allows the output signals from the respective position displacement detection signals 12, 14 to become VD7, VD8, respectively, shown in FIG. 8, and a sum of the outputs of the position displacement detection sensors 12, 14 is expressed as follows:

$$2 \times VD1 > VD7 + VD8 (VD1 = VD2) \qquad (3)$$

The equation (3) shows deviation from the condition which satisfies the equation (1).

Namely, a change in temperature appearing in the controlled object 15 results in a change in the size of the gaps between the position displacement detection sensors 12, 14 and the controlled object 15, and therefore, a sum of the outputs from the position displacement detection sensors 12, 14 changes.

In order to detect a value of such a change, the temperature calculation circuit unit 30 is provided in the control device separately from the control circuit unit 20 which performs control of magnetic suspension, as shown in FIG. 3. A signal processing unit 33 of the temperature calculation circuit unit 30 is constructed such as shown in FIG. 4. The respective outputs VD3, VD4 of the position displacement detection sensors 12, 14 are added to obtain (VD3+VD4) by the addition/subtraction circuit unit 33-1, as shown In the equation (1), and a predetermined Initial value (VD1+VD2) preset in the initial value presetting unit 33-3 is subtracted from the added value to compute a value of change in size of the gaps.

Figure 11:
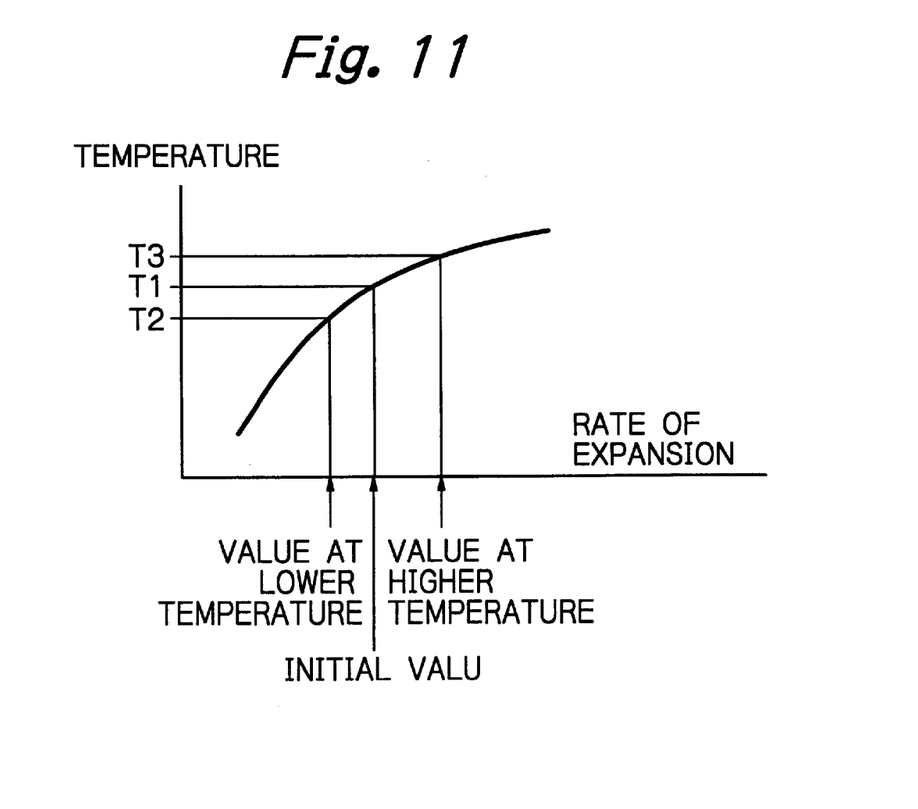
FIG. 11 is a diagram showing a relationship between the rate of expansion of a constituent material of the controlled object and temperature.

The rate of expansion found in the controlled object 15 is calculated from the value of change in size of the gaps obtained by the addition/subtraction circuit unit 33-1. Further, based on a value of change in temperature of the components determined by the calculated rate of expansion, a value of change in temperature of the controlled object 15 is calculated by the coefficient calculation unit 33-2, as shown in FIG. 11. It is noted that, in FIG. 11, the axis of abscissas Indicates the rate of expansion, while the axis of ordinates indicates the temperature of the materials forming the controlled object 15.

Using the value of change in temperature calculated by the coefficient calculation unit 33-2, the protection circuit unit 70 outputs an alarm and indication signal given to the outside of the magnetic suspension device for urging maintenance or a signal for stopping suspension control itself of the magnetic suspending device in a case where it is detected that a predetermined temperature has been reached at which serious damages are expected to be caused to the magnetic suspending device in view of the characteristics of the materials of the mechanical components constituting the controlled object 15.

The present invention has been described In detail with reference to the drawings, but various modifications and variations to the present invention can be possible. For example, in the embodiment described above, the respective output signals from the position displacement detection sensors 12, 14, as shown in the equations (1) to (3) are added for protection purposes by the addition/subtraction circuit unit 33-1. It is apparent, however, that similar advantages can be obtained if the respective output signals from the position displacement detection sensors 12, 14 are subtracted in a subtraction circuit.

The present disclosure relates to the subject matter contained in Japanese Patent Application No. Hei 11-64989 filed on Mar. 11, 1999, which is expressly incorporated herein by reference in its entirety.

What is claimed is:

1. A magnetic suspending device comprising:

a pair of electromagnets disposed opposite to each other;

a magnetizable controlled object disposed between said pair of electromagnets;

position displacement detection sensors disposed opposite to each other for detecting a position displacement of said controlled object;

a control device for controlling magnetic forces generated by said pair of electromagnets so as to magnetically suspend said controlled object without contact in accordance with detection signals outputted from said position displacement detection sensors; and a temperature calculation circuit which detects a change in size of said control object on the basis of the detection signals from said position displacement detection sensors, thereby detecting a temperature of said controlled object.

2. A magnetic suspending device as set forth in claim 1, wherein said temperature calculation circuit is provided as a displacement detection circuit system separate from a magnetic suspension control system including said control device, said temperature calculation circuit operable to detect a size of gaps existing between said controlled object and said position displacement detection sensors without giving any influence to said magnetic suspension control system, thereby detecting the temperature of said controlled object on the basis of a change in the size of the gaps and a rate of expansion of said controlled object.

3. A magnetic suspending device as set forth in claim 1 or 2, further comprising a protection circuit for at least one of (i) giving an alarm to an outside and (ii) stopping operation of said magnetic suspending device when the temperature of said controlled object detected by said temperature calculation circuit become equal to or higher than a predetermined temperature.

* * * * *